Figure 1:
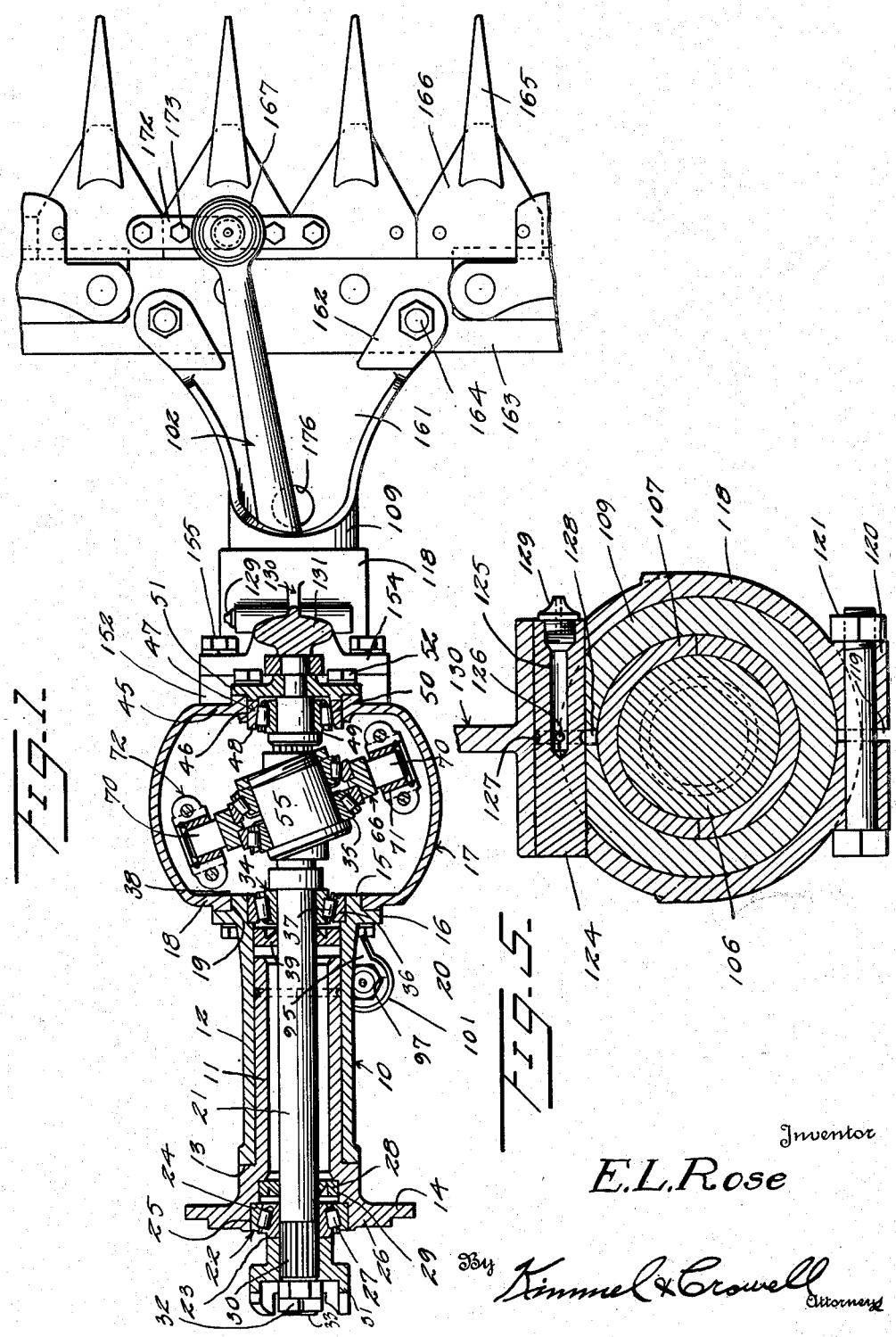

Oct. 7, 1941.  E. L. ROSE  2,258,517
SICKLE MOWER ATTACHMENT
Filed May 2, 1941  3 Sheets-Sheet 1

Inventor
E. L. Rose
By Kimmel & Crowell
Attorneys

Oct. 7, 1941.  E. L. ROSE  2,258,517
SICKLE MOWER ATTACHMENT
Filed May 2, 1941  3 Sheets-Sheet 3

Inventor
E. L. Rose
By Kimmel & Crowell
Attorneys

Patented Oct. 7, 1941

2,258,517

UNITED STATES PATENT OFFICE 2,258,517

SICKLE MOWER ATTACHMENT

Eustace L. Rose, Charleston, W. Va., assignor to Gravely Motor Plow & Cultivator Co., Dunbar, W. Va.

Application May 2, 1941, Serial No. 391,610

15 Claims. (Cl. 56—296)

This invention relates to an improved driving means for a sickle mower.

An object of this invention is to provide an improved operating means for a sickle mower which may be attached to a power unit for translating rotary movement to reciprocatory movement.

Another object of this invention is to provide a device of this kind whereby a straight line reciprocatory motion is imparted to the movable cutter bar.

A further object of this invention is to provide in a device of this kind, means whereby the reciprocatory means for the movable cutter bar will impart a reverse counter-balancing movement to the stationary cutter bar so that cuttings will not collect on the stationary cutter and so as to reduce or smooth out the vibrations of the device.

A further object of this invention is to provide an attachment of this kind in which the reciprocatory movement of the movable cutter bar is effected by means of a rotary wabble structure.

A further object of this invention is to provide an attachment of this kind in which one cutter member is movable relative to the other cutter member, and the length of the movement of each cutter member is proportionate to the weight thereof so as to thereby provide a substantially even balance between the cutter members and permit the use of a relatively small power device.

A further object of this invention is to provide a device of this kind which is so constructed and arranged as to eliminate the usual hammering caused by operation of the device at high speed.

A further object of this invention is to provide a mower attachment of this kind wherein the mower may freely swivel with respect to the power unit so that the mower may follow the undulations in the terrain independent of the power unit.

A further object of this invention is to provide in a device of this kind a pivoted connecting lever between the driving crank and the knife bar and a mounting for the lever which will permit endwise movement of the lever and in which the force actuating the knife bar is also used to exert a counter movement to the lower cutter and guard bar, so as to provide a scissor action in which the heavier or lower part thereof has a substantially shorter movement than the upper part and thereby constitutes a counter-balancing means for smoothing out the vibrations of the device at any speed.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

Figure 2:
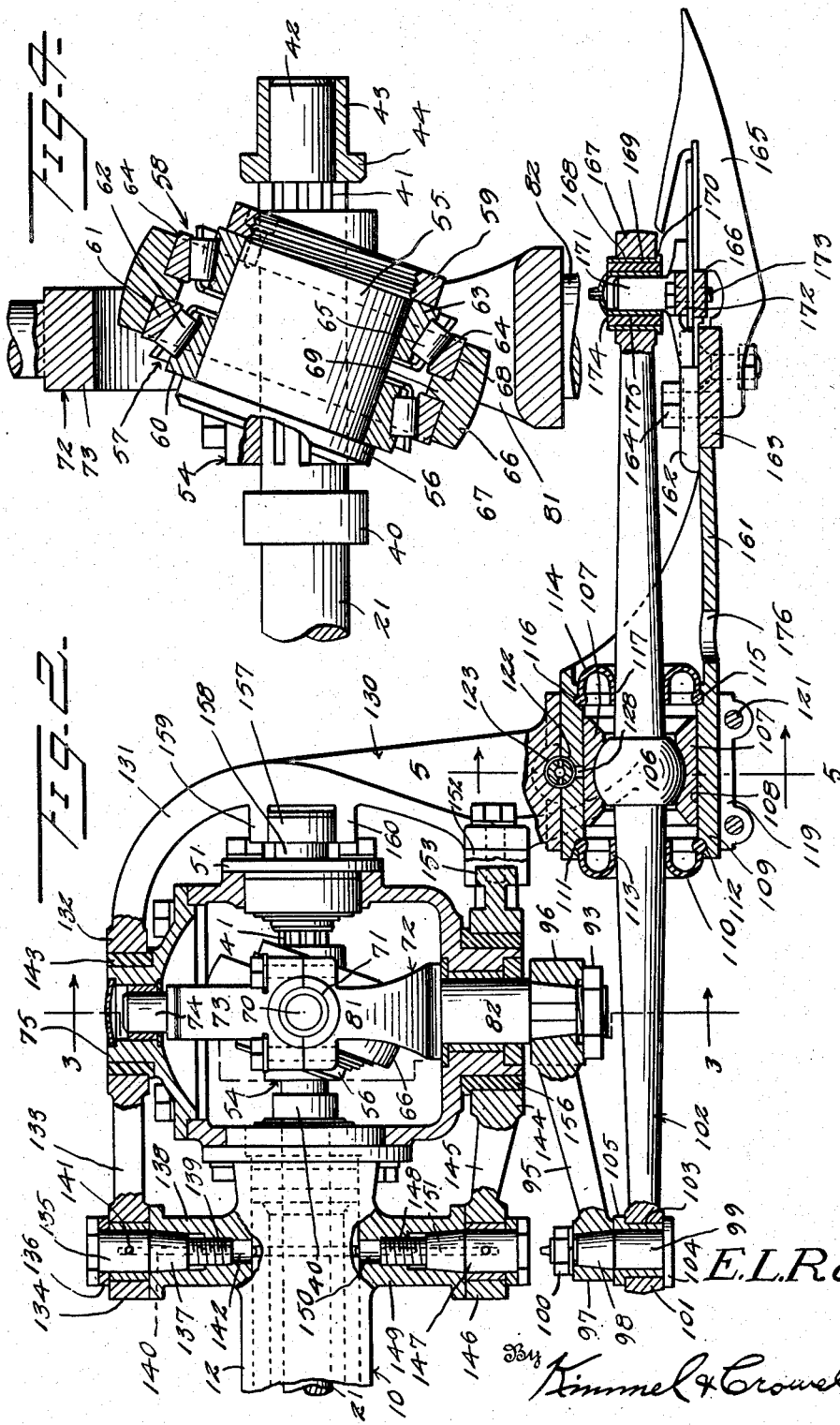
Figure 3:
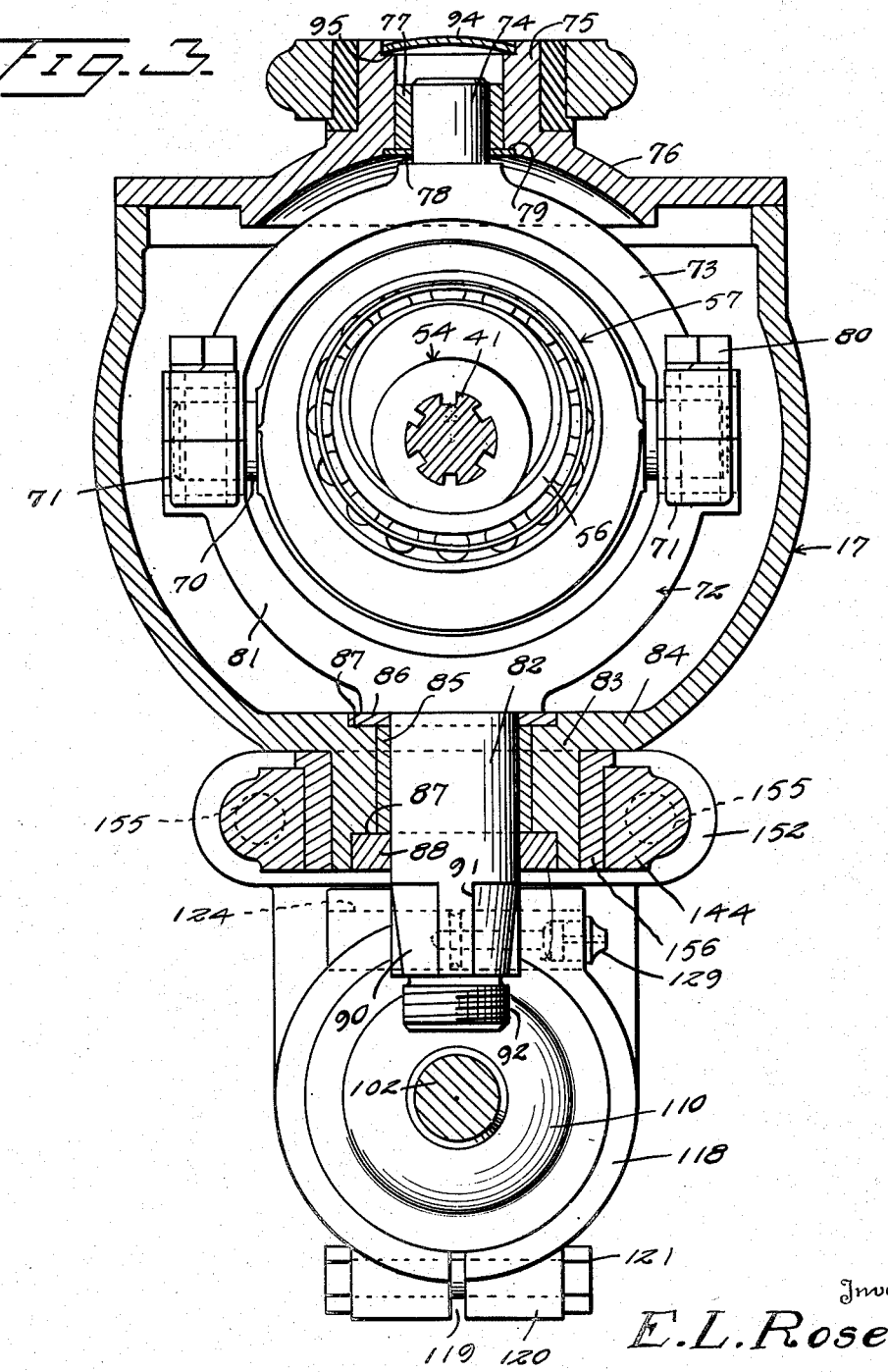

In the drawings:

Figure 1 is a horizontal section partly broken away and in detail of a combined driving mechanism and cutter means constructed according to an embodiment of this invention, Figure 2 is a fragmentary vertical section partly broken away and in detail of the device, Figure 3 is a sectional view taken on the line 3—3 of Figure 2, Figure 4 is an enlarged fragmentary sectional view of the driving means, and Figure 5 is a sectional view taken on the line 5—5 of Figure 2.

Referring to the drawings, the numeral 10 designates generally a tubular housing, which is adapted to be connected to a suitable power means in the form of a power take-off or the like. The housing 10 includes an inner tubular housing member 11 and an outer tubular member 12 telescoping the inner member 11. The inner member 11 is formed at its rear end with a shoulder 13 against which the rear end of the housing 12 is adapted to abut. The inner housing member 11 is also provided with a flanged rear end 14, which is adapted to be bolted to the power take-off means.

The forward end of the housing 12 is provided with an annular member 15 and an annular flange 16 rearwardly of the annular member 15. A housing 17, which is formed with a rear wall 18 having an opening 19, is adapted to engage on the annular member 15 and abut against the flange 16. The housing member 17 is secured to the flange 16 by fastening devices 20. A drive shaft 21 is rotatably disposed within the housing 10 and also extends within the housing member 17. The shaft 21 is substantially smaller in diameter than the inner diameter of the inner tubular member 11 and is rotatably supported at its rear end by an anti-friction bearing member 22. The bearing member 22 includes an inner race 23, which engages about the shaft 21 and an outer race 24, which engages in the seat 25 formed in the plate 26 forming the rear end portion of the housing 11. Roller bearings 27 are interposed between the two race members 23 and 24. The anti-friction bearing 23 also constitutes a thrust bearing and a packing ring 28 is disposed about the shaft 21 inwardly from the anti-friction bearing 22 and is seated in an annular seat 29 formed in the inner housing member 11 inwardly from the bearing seat 25.

The rear portion of the shaft 21 is formed with splines 30 about which a clutch element 31 engages. The clutch element 31 abuts against the inner race member 23 and the clutch member 31 is held on the shaft 21 by a nut 32, which is threaded onto a reduced threaded stud 33 formed on the rear end of the shaft 21.

A second anti-friction bearing 34 is mounted on the shaft 21 and includes an inner race member 35, an outer race member 36 and rollers 37. The bearing 35 is a thrust bearing which is disposed in opposed relation to the thrust bearing 22, and the bearing 34 engages in a bearing seat 38, which is formed in the annulus 15. A sealing washer 39 is disposed about the shaft 21 rearwardly from the bearing 34 and seats within the interior of the housing member 12 forwardly from the forward end of the inner housing member 11.

The shaft 21 is formed with an annular collar 40, which is adapted to abut against the bearing member 34, so that tightening of the nut 32 on the rear end of the shaft 21 will firmly hold the two bearing members 22 and 34 in the housing members 11 and 12. The flange or rib 40 is disposed within the housing member 17 and the shaft 21 within the housing 17 is formed with a splined section 41 and a reduced stub 42 extending from the splined section 41. A cylindrical bearing 43 engages about the stub shaft 42 and is formed at its rear end with an annular flange 44. The housing 17 is formed with a forward wall 45 having an annular opening 46 within which an anti-friction bearing 47 is adapted to engage. The bearing 47 includes an outer race member 48, an inner race member 49 and rollers 50. The inner race member 49 is adapted to abut against the collar or flange 44 and a cap 51 is secured by fastening devices 52 to the forward wall 45 of the housing 17 and is provided with an annular rib 53, which bears against the outer race member 48.

The shaft 21 within the housing member 17 has mounted thereon a splined wabble block 54, which engages the splined section 41. The block 54 includes a cylindrical member 55, which is disposed at an angle to the longitudinal axis of the shaft 21 and an annular flange 56 is formed at one end of the cylindrical member 55. A pair of anti-friction bearings 57 and 58 are mounted on the cylindrical member 55 and the bearing member 58 is held against endwise movement by means of a threaded nut 59 engaging the cylindrical member 55 at the end thereof opposite from the flange 56. The bearing member 57 includes an inner race member 60 mounted on the cylindrical member 55 and abutting at its outer portion the flange 56. The bearing 57 also includes an outer race member 61 and rollers 62 interposed between the two race members 60 and 61. The bearing member 58 includes an inner race member 63 engaging the cylindrical member 55 and abutting against the nut 59. The bearing member 58 also includes an outer race member 64 and rollers 65 interposed between the two race members 63 and 64.

An annulus 66 is disposed about the anti-friction bearings 57 and 58 and the outer race members 61 and 64 engage within annular seats 67 and 68 respectively, which are formed within the annulus 66. The annulus 66 also includes an intermediate or dividing rib 69, which engages between the two race members 61 and 64, so as to hold these two race members in spaced apart relation.

The annulus 66 is provided with a pair of diametrically opposed trunnions 70 which engage in a pair of bearings 71 carried by a split annulus 72. The split annulus 72 has secured to one portion 73 thereof a vertically disposed trunnion 74, which engages within a bearing housing 75 carried by the top wall 76 of the housing 17. A cylindrical bearing 77 is disposed about the trunnion 74 and engages within the bearing housing 75. An annular thrust washer 78 is mounted in a seat 79 formed in the inner end portion of the bearing housing 75 so as to take up endwise thrust of the annulus 72 in an upward direction. The split bearing 71 is held tightly together by means of bolts or fastening devices 80. The annulus 72 also includes a lower substantially semi-circular member 81, which is formed with a trunnion or stub shaft 82. The trunnion or stub shaft 82 engages within a bearing housing 83 formed in the lower wall 84 of the housing 17 and a bearing lining 85 is carried by the bearing member 83 and engages about the stub shaft 82. A thrust washer 86 is mounted in a seat 87 formed in the inner end of the bearing housing 83 and a second thrust washer 88 is mounted in a seat 89 formed in the outer or lower end of the bearing housing 83.

The stub shaft or trunnion 82 extends below the bearing housing 83 and is formed with a tapered lower end portion 90 having splines 91. A threaded stub 92 extends from the tapered coupling member 91 and a nut 93 is adapted to be threaded onto the threaded stub 92. As shown in Figure 3, the upper end of the bearing housing 75 is open and a removable disc-shaped closure 94 is adapted to engage in an annular seat 95 formed in the outer end portion of the housing 75. The closure 94 is constructed in the form of a thin disc, which is pressed into the recess 75 and which is adapted to assume an arcuate configuration as shown in Figures 2 and 3.

A relatively short crank 95 having a hub 96 is mounted on the tapered splined section 90 of the stub shaft 82, being held thereon by the nut 93. The crank 95 has a bearing 97 at the opposite end thereof and the tapered end portion 98 of a stub shaft 99 engages in the bearing hub 97. The stub shaft 99 at the smaller end thereof is provided with a threaded section on which a holding nut 100 is threaded. The stub shaft 99 engages within an annular bearing member 101 carried by a pitman generally designated as 102. The pitman 102 has mounted in the bearing member 101 thereof a flanged bearing lining 103 and the stub shaft 99 is formed at its lower end with a flange 104 abutting against the lower end of the bearing member 101. The flange 105 of the bearing lining 103 is interposed between the bearing member 97 and the upper end of the bearing member 101, so as to hold the crank 95 at its outer end in spaced relation to the adjacent end of the pitman 102.

The pitman 102 at a point intermediate the ends thereof is provided with a ball member 106 which engages in a split socket 107 having a cylindrical outer surface 108. The socket 107 is slidable endwise in a cylindrical housing 109 and the housing 109 at its rear end is closed by a resilient closure member 110 formed with an annular rib 111 seating in a groove 112 provided in the housing 109. The sealing member 110 has a reverted portion 113 which tightly engages about the surface of the trunnion 102 rearwardly from the ball member 106. A second resilient sealing member 114 engages about the trunnion 102 forwardly from the ball 106 and is provided with an annular rib 115 engaging in an annular groove 116 formed in the cylindrical housing 109 forwardly from the ball 106. The sealing member 114 also includes a substantially cylindrical inner part 117 tightly engaging about the pitman 102 so as to prevent any dirt or foreign matter from entering the interior of the housing 109. The bearing housing 109 is removably mounted in a cylindrical split housing 118, which is split, as at 119, at the lower side thereof and formed with ears 120, which are bolted together by bolts 121 so that the cylindrical bearing housing 109 may be tightly held within the outer housing 118. In order to provide a means whereby the inner bearing housing 109 may be accurately and properly positioned within the outer housing 118, the bearing housing 109 is formed with a transversely extending groove or key-way 123, which is complementary to the key-way 102 and a positioning pin or key 124 engages in the confronting key-ways 122 and 123.

The key or pin 124 is formed with an axial lubricating duct 125, which communicates through radial openings 126 with an annular groove 127 formed in the pin 124. A duct 128 is formed in the inner bearing housing 109 and communicates with the groove 127, so that a lubricant discharged into the duct 125 will enter the interior of the inner housing 109 in order that the ball socket 107 may have free endwise movement within the inner housing or bearing 109. A lubricant fitting 129 may be mounted on one end of the key or pin 124 so as to facilitate the discharge of a suitable lubricant into the duct 125.

The outer housing 118 is fixed or formed integral with a swinging bracket 130. The bracket 130 extends vertically upwardly from the housing 118 and is formed at its upper portion with a rearwardly extending arcuate extension 131 which merges into an annulus 132. The annulus 132 loosely engages about the exterior of the bearing housing 75 and a rearwardly extending arm 133 extends rearwardly from the annulus 132. A bearing or boss 134 is formed on the rear end of the upper arm 132 and a stationary shaft or pin 135 engages through the bearing boss 134. A flanged bearing liner 136 is mounted in the boss 134 and engages about the stationary shaft 135. The shaft 135 is formed below the boss 134 with a tapered portion 137 engaging in an upstanding boss 138, which is formed integral with the outer housing member 12. The lower end of the tapered shaft portion 137 terminates in a reduced threaded stub 139, which is threaded into the boss 138. The stub 135 is formed with a lubricating duct or channel 140 opening through the lower end thereof and lateral ducts 141 are formed in the upper shaft portion 135 and confront the bearing lining 136.

The housing 12 is formed with an opening 142 communicating with the boss 138 so that a lubricant in the tubular housing 12 will enter the opening or chamber 124 and pass upwardly through the duct 140 and the lateral ducts 141. A rubber or resilient annulus 143 is interposed between the bearing member 75 and the annulus 132 so that, as will be hereinafter described, the bracket structure 130 may have a limited horizontal movement relative to the bearing member 75.

An annulus 144 is loosely disposed about the bearing member 83 and is provided with a rearwardly extending arm 145 terminating in a bearing boss 146. A stationary shaft 147 similar to the shaft 135 engages through the boss 146 and is threaded, as at 148, into a boss 149 formed integral with the housing 12 and disposed diametrically opposite the boss 138. The housing 12 is also formed with an opening or chamber 150, which communicates with a lubricating duct 151 formed axially of the shaft 147. The annulus 144 has integral therewith a pair of forwardly extending ears 152, and a web 153 connects the two ears 152 together. The bracket 130 is also provided with a pair of opposed ears 154 confronting the ears 152 and the ears 154 are secured to the ears 152 by fastening devices 155. An annular or cylindrical resilient member 156 is interposed between the ring or annulus 144 and the bearing housing 83 so that the ring or annulus 144 may have horizontal swinging movement relative to the bearing member 83 with the shaft 147 as a fulcrum.

In order to provide a means whereby the bracket 130 may be steadied in its horizontal or lateral swinging movement, I have provided a roller 157 which is mounted on a pin 158 carried by the cap or plate 51. The bracket 130 is provided with upper and lower guide members or tracks 159 and 160 between which the roller 157 engages.

The housing 109 at its forward end is formed with an outwardly flared extension 161, which is formed with integral upwardly offset forwardly divergent ears 162. A stationary cutter bar 163 is secured by fastening devices 164 to the ears 162 and the rear edge of the stationary or lower cutter bar 163 abuts against the forward edge of the extension 161. The lower bar 163 has secured thereto a plurality of forwardly extending guard members 165 and a movable or reciprocating cutter or knife bar 166 engages the guard members 165. The pitman 102 at its forward end is provided with an annular boss 167 having an annular opening 168 therethrough. A cylindrical metal liner 169 engages in the opening 168 and is formed with a lower flange 170 engaging against the lower end of the boss 167. A vertically disposed trunnion or pin 171 is carried by an elongated bar 172, which is fixed by fastening members 173 to the knife bar 166. The trunnion 171 engages in a bearing cap 174 and the cap 174 engages in a resilient annulus 175, which is interposed between the outer surface of the cap 174 and the inner surface of the cylindrical liner 169.

In the use and operation of this attachment the housing 10 is adapted to be secured by bolts or the like, which engage through the flange 14 of the housing member 11. The clutch member 31 is adapted to engage a complementary clutch member carried by the power unit, so as to provide for the rotation of the shaft 21. As the shaft 21 rotates the annulus 66 will be oscillated back and forth and this oscillating movement will be communicated to the split annulus 72 so as to effect a rocking of the shaft 82 and the trunnion 74. The rocking of the shaft 82 will swing the crank 95, which will in turn swing the pitman 102 with the ball 106 in the socket 107 as a fulcrum.

In view of the fact that the length or radius of the crank 95 is shorter than the radius from the ball 106 to the rear end of the pitman 102, the pitman 102 will be moved endwise coactive with the swinging movement thereof. This endwise movement of the pitman 102 will provide for the straight line or reciprocating movement of the knife bar 166 and the hammering or vibration of the pitman 102 in its swinging movement relative to the knife bar 166 will be dampened or cushioned by the resilient cushion member 175.

Simultaneous with the reciprocation of the knife bar 166 back and forth by swinging of the pitman 102, the force exerted on the pitman 102 by the crank 95 will also exert a reverse movement to the bracket 130. This bracket 130 being swingably mounted on the stationary diametrically opposed pins or shafts 135 and 147 will be permitted a limited swinging movement determined by the cushioning members 143 and 156. The reverse swinging of the bracket 130 will likewise effect a reverse movement of the lower bar 163 and the guard members 165, which reverse movement will be substantially less in length than the reciprocating movement of the bar 166. However, as the lower bar 163 with the guard members 165 is substantially heavier than the knife bar 166 the reverse movement of the guard bar 163 and the guards 165 will act as a counterbalancing means which counter-balances the reciprocation of the knife bar 166. The reciprocation or reverse movement of the bar 163 and the guards 165 will not only have a counter-balancing action with respect to the knife bar 166, but will also provide a means whereby the material cut by the knife bar 166 will be prevented from lodging or sticking onto the guard members 165 and the bar 163. In this manner the material which is being cut by this device will not clog up the cutter, which is the case in devices of this type which do not provide for the reverse movement of the lower cutter bar and the guard members. Due to this counter-balancing of the cutter the knife bar may be operated at a relatively high speed without causing undue vibration to the power unit and its associated parts. The forward extension 161 of the bearing housing 109 is formed with a fairly large opening 176 so that any loose material engaging on the flared extension 161 may freely drop through the opening 176.

The two telescoping housings 11 and 12 are loosely connected together so that the outer housing 12 may swivel or rotate on the inner housing 11. In this manner the device when in operation may freely follow any undulations in the ground or terrain independent of the movement of the power unit.

What I claim is:

1. A mower attachment for a power device comprising a drive shaft, means at one end of said shaft for coupling said shaft to the power device, a lower cutter means, an upper cutter means arranged over said lower cutter means, said lower and upper cutter means being disposed at right angles to the length of said shaft, a pitman connected at one end to said upper cutter means for reciprocating the latter, means connecting the other end of said pitman with said drive shaft, and means operatively connected with said pitman and said lower cutter means and operable by movement of said pitman for reciprocating said lower cutter means reversely from said upper cutter means while simultaneously supporting said pitman.

2. A mower attachment for a power device comprising a drive shaft, means at one end of said shaft for coupling said shaft to the power device, a lower cutter means, an upper cutter means arranged over said lower cutter means, said lower and upper cutter means being disposed at right angles to the length of said shaft, a pitman connected at one end to said upper cutter means for reciprocating the latter, means connecting the other end of said pitman with said drive shaft, and means operatively connected with said pitman intermediate its ends and with said lower cutter means for reciprocating said lower cutter means reversely from said upper cutter means while simultaneously supporting said pitman.

3. A mower attachment for a power device comprising a drive shaft, a pair of reciprocable cutter members disposed at right angles to said drive shaft, means connected with one of said cutter members and with said drive shaft for reciprocating said one cutter member, and means connected with the other cutter member supporting a portion of said first means and operable thereby whereby the force exerted to effect reciprocation of said one cutter member will simultaneously exert a force on said other cutter member to thereby effect reverse movement of said other cutter member relative to said one cutter member.

4. A mower attachment for a power device comprising a drive shaft, a pair of reciprocable cutter members disposed at right angles to said drive shaft, means connected with one of said cutter members and with said drive shaft for reciprocating said one cutter member, and means connected with the other cutter member and supporting a portion of said first means whereby the force exerted to effect reciprocation of said one cutter member will simultaneously exert a force on said other cutter member to thereby effect reverse movement of said other cutter member which is substantially shorter in length than the length of movement of said one cutter member.

5. A mower attachment for a power device comprising a housing structure, a drive shaft in said structure, a pair of superposed reciprocable cutter members forwardly of said structure and disposed at right angles to said shaft, a pitman connected with said shaft and one of said cutter members for reciprocating said one cutter member, and means swingably carried by said housing, pivotally connected with said pitman and fixed to said other cutter member whereby to pivotally support said pitman intermediate its ends and whereby the force exerted to rock said pitman will also effect swinging of said swingable means and a reverse movement of said other cutter member.

6. A mower attachment for a power device comprising a housing, means for attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carrier by another part of said housing, a supporting member fixed to the other cutter member and to said swingable member, and means carried by said supporting member pivotally supporting an intermediate portion of said pitman, rocking of said pitman in one direction effecting a swinging of said swingable member in the opposite direction to thereby effect a reverse movement of said other cutter member.

7. A mower attachment for a power device comprising a housing, means for attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carried by another part of said housing, a supporting member fixed to the other cutter member and to said swingable member, means carried by said supporting member pivotally supporting an intermediate portion of said pitman, rocking of said pitman in one direction effecting a swinging of said swingable member in the opposite direction to thereby effect a reverse movement of said other cutter member, and means carried by said housing and engaging said swingable member for limiting the movement of said swingable member.

8. A mower attachment for a power device comprising a housing, means for attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carried by another part of said housing, a supporting member fixed to the other cutter member and to said swingable member, means carried by said supporting member pivotally supporting an intermediate portion of said pitman, rocking of said pitman in one direction effecting a swinging of said swingable member in the opposite direction to thereby effect a reverse movement of said other cutter member, and yieldable means carried by said housing and engaging said swingable member for limiting the movement of said swingable member.

9. A mower attachment for a power device comprising a housing, means for attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carried by another part of said housing, a supporting member fixed to the other cutter member and to said swingable member, means carried by said supporting member pivotally supporting an intermediate portion of said pitman, rocking of said pitman in one direction effecting a swinging of said swingable member in the opposite direction to thereby effect a reverse movement of said other cutter member, and means carried by said housing and engaging said swingable member for limiting the movement of said swingable member, said latter means including diametrically opposed elements fixed to said housing, means fixed to said swingable member and encompassing said elements, and yieldable means interposed between said elements and said latter mentioned means.

10. A mower attachment for a power device comprising a housing, means for attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carried by another part of said housing, a supporitng member fixed to the other cutter member and to said swingable member, means carried by said supporting member pivotally supporting an intermediate portion of said pitman, rocking of said pitman in one direction effecting a swinging of said swingable member in the opposite direction to thereby effect a reverse movement of said other cutter member, and means carried by said housing and engaging said swingable member for limiting the movement of said swingable member, said latter means including diametrically opposed elements projecting from and fixed to said housing, annular members fixed to said swingable member and engaging losely about said elements, and yieldable bushings interposed between said elements and said annular members for yieldably resisting movement of said swingable member relative to said housing.

11. A mower attachment for a power device comprising a housing, means for swivelly attaching said housing to the power device, a drive shaft rotatably carried by said housing, a pair of superposed reciprocable cutter members forwardly of said housing and disposed at right angles to said shaft, a pitman operatively connected with said shaft and one of said cutter members for reciprocating said one cutter member, a swingable member carried by another part of said housing, a supporting member fixed to the other cutter member and to said swingable member, and means carried by said supporting member pivotally supporting an intermediate portion of said pitman, rocking of said pitman in one direction effecting a swinging of said swingable member in the opposite direction to thereby effect a reverse movement of said other cutter member.

12. A mower attachment for a power device comprising a housing, means swivelly attaching said housing to the power device, a drive shaft rotatably carried by said housing, a pair of superposed reciprocable cutter members forwardly of said housing, a pitman connected at one end with one of said cutter members, means connected with said drive shaft and the other end of said pitman for translating the rotary motion of said shaft into oscillatory motion for rocking said pitman, swingable supporting means for the other cutter member carried by said housing, and pivotal means carried by said supporting means engaging said pitman intermediate the ends of the latter for pivotally supporting said pitman from said housing, rocking of said pitman effecting reciprocation of said one cutter member and also simultaneous reverse reciprocation of said other cutter member.

13. A mower attachment for a power device comprising a housing, means swivelly attaching said housing to the power device, a drive shaft rotatably carried by said housing, a pair of superposed reciprocable cutter members forwardly of said housing, a pitman connected at one end with one of said cutter members, wabble means connected with said drive shaft and the other end of said pitman for translating the rotary motion of said shaft into oscillatory motion for rocking said pitman, swingable supporting means for the other cutter member carried by said housing, and pivotal means carried by said supporting means engaging said pitman intermediate the ends of the latter for pivotally supporting said pitman from said housing, rocking of said pitman effecting reciprocation of said one cutter member and also simultaneous reverse reciprocation of said other cutter member.

14. A mower attachment for a power device comprising a housing, means swivelly attaching said housing to the power device, a drive shaft rotatably carried by said housing, a pair of superposed reciprocable cutter members forwardly of said housing, a pitman connected at one end with one of said cutter members, means connected with said drive shaft and the other end of said pitman for translating the rotary motion of said shaft into oscillatory motion for rocking said pitman, swingable supporting means for the other cutter member carried by said housing, means carried partly by said supporting means and partly by an intermediate portion of said pitman supporting said pitman for rocking movement relative to said housing coactive with endwise movement of said pitman, the combined rocking and endwise movement of said pitman effecting a straight line reciprocation of said one cutter member and also simultaneous reverse reciprocation of said other cutter member.

15. A mower attachment for a power device comprising a housing, a drive shaft rotatably carried by said housing, a pair of superposed reciprocable cutter members, means supporting said members from said housing at right angles to the length of said shaft, means connected with said shaft for reciprocating both of said cutter members, and means swivelly attaching said housing to said power device whereby said cutter members may rock laterally with respect to said power device.

EUSTACE L. ROSE.